United States Patent
Wager et al.

(10) Patent No.: US 6,580,990 B2
(45) Date of Patent: Jun. 17, 2003

(54) INTEGRITY CHECK FOR ELECTRIC STEER SYSTEM

(75) Inventors: Scott Wager, Canandaigua, NY (US); David Norton, Port Crane, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 09/940,033

(22) Filed: Aug. 27, 2001

(65) Prior Publication Data

US 2002/0049524 A1 Apr. 25, 2002

Related U.S. Application Data

(60) Provisional application No. 60/229,172, filed on Aug. 30, 2000.

(51) Int. Cl.[7] .............................................. G06F 19/00
(52) U.S. Cl. ............................. 701/43; 701/31; 340/439
(58) Field of Search .............................. 701/29, 31, 43, 701/50; 340/438, 439; 324/523

(56) References Cited

U.S. PATENT DOCUMENTS

| | | | | |
|---|---|---|---|---|
| 3,947,764 A | * | 3/1976 | Abbott et al. ................. | 322/99 |
| 4,532,567 A | | 7/1985 | Kade | |
| 4,550,286 A | | 10/1985 | Holland et al. | |
| 4,786,866 A | * | 11/1988 | Yabe et al. .................. | 324/772 |
| 4,881,611 A | | 11/1989 | Nakashima et al. | |
| 4,961,144 A | | 10/1990 | Yabe et al. | |
| 4,972,133 A | | 11/1990 | Hirota et al. | |
| 5,168,236 A | | 12/1992 | Schuyler | |
| 5,303,156 A | * | 4/1994 | Matsuoka et al. .......... | 180/404 |
| 5,315,256 A | | 5/1994 | Schuyler | |
| 5,778,327 A | | 7/1998 | Simmons et al. | |
| 6,107,926 A | * | 8/2000 | Kifuku et al. ............... | 318/432 |

* cited by examiner

Primary Examiner—Michael J. Zanelli
(74) Attorney, Agent, or Firm—Quarles & Brady, LLP (57) ABSTRACT

An industrial lift truck includes a steering unit which operates in response to steering commands to operate an electric steering motor that turns a steerable wheel. The integrity of the steering unit is checked by applying alternating steering commands to the steering unit and monitoring the resulting current flow through the steering motor.

11 Claims, 7 Drawing Sheets

INTEGRITY CHECK FOR ELECTRIC STEER SYSTEM

RELATED PATENT APPLICATIONS

This application is based on U.S. Provisional Application Serial No. 60/229,172, filed on Aug. 30, 2000 and entitled "Integrity Check For Electric Steer System".

BACKGROUND OF THE INVENTION

The field of this invention is industrial trucks powered by electric motors, and particularly, the electric steer systems for such trucks.

Industrial trucks such as lift trucks include a mast which is mounted to a tractor. The tractor includes a set of wheels which facilitate truck movement within a factory, a warehouse or the like. At least one wheel is driven by an electric motor to move the industrial truck, and the same or other wheel(s) are steerable in response to commands produced by manual operation of a steering tiller or steering wheel, or automatic operation of a wire guidance system. The steer unit includes an amplifier which provides current to an electric steering motor that drives the steerable wheel(s) to a commanded orientation as described, for example, in U.S. Pat. No. 5,778,327. A feedback device provides a signal indicative of steer unit orientation and this may be used to indicate steer wheel orientation to the truck operator as described in U.S. Pat. No. 5,680,099.

The proper operation of the steer unit is important whenever the industrial truck is in motion. Conditions that may affect the functionality of electric steer units include shorted, open or disconnected wires, shorted or open motors, and damaged circuitry. As a consequence, it is common practice to periodically check the integrity of the steer system and bring the truck to a halt, or disable operation of the truck if a problem is detected.

One method for checking the integrity of the steer system is to pulse the steer motor at a set rate and pulse duration. If there is no resulting current flow through the steer motor, a fault is declared. One limitation of this method is that it only checks for open circuit failures, not short circuit conditions. Another limitation is that it only partially checks steer unit integrity by sensing current flow in one direction through the steer motor.

SUMMARY OF THE INVENTION

The present invention is a method and apparatus for checking the integrity of an electric steering system on an industrial truck. More particularly, steering commands of alternating polarity are applied to the steer unit during truck operation, the resulting current flow through the steer motor is measured, and a fault is indicated if the measured current is below a preset amount (open circuit condition) or above a second preset amount (short circuit condition). These commands do not produce any net change in truck direction but they result in measurable current flow alternately in each direction through the steer motor.

A general object of the invention is to more fully test the steer unit integrity on an industrial truck. By measuring current flow through the steer motor and comparing it with both upper and lower preset limits, both open, and short circuit conditions are detected. By alternating the polarity of the voltage pulses, a more complete check of system integrity is made without affecting steering orientation.

One of the advantages of this invention is that the integrity check of the steer system is accomplished in a background mode, when there is no overt request for a change in steered direction. In normal operation, a lift truck may travel a considerable distance/time in the absence of any steering request from the operator or wire guidance system. The advantage of this approach is that the system is constantly monitored, and is capable of detecting faults in the steer system prior to the need for steering.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
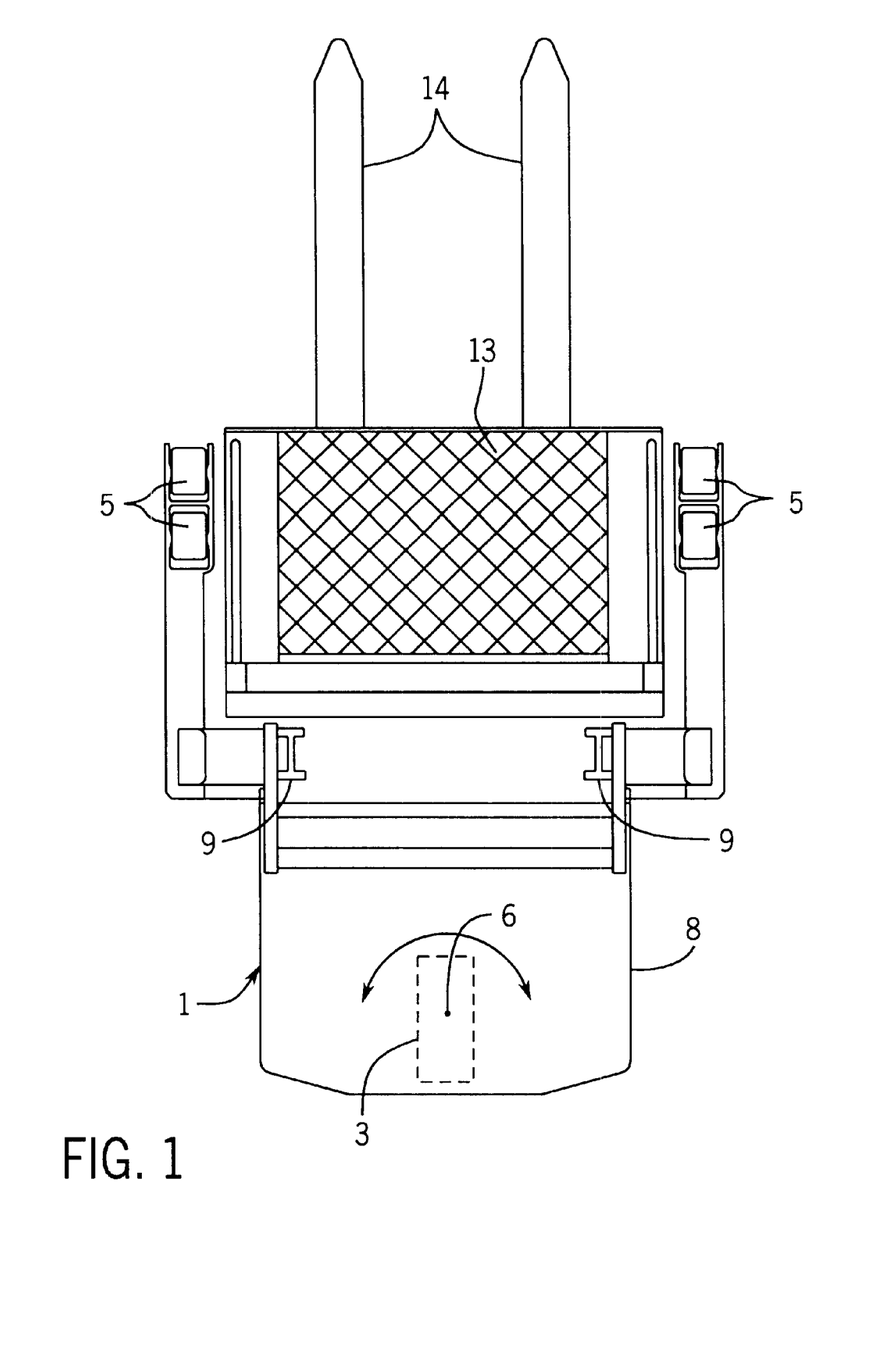
FIG. 1; is a pictorial representation of an industrial truck to which the present invention may be applied.

Referring particularly to FIG. 1, a lift truck has a base frame 1 which is driven by a central, rear steerable drive wheel 3, and supported by pairs of unpowered, non-steerable load wheels at 5 on each side. The drive wheel 3 is rotatable about a vertical axis 6 by an electric steering motor in either a clockwise direction (CW) or counter clockwise direction (CCW) to steer the truck 1 to the left or right. A vertical mast 9 extends upward from the base frame 1 and supports a platform 13 and forks 14 which may be elevated to different heights by a hydraulic system (not shown). The truck 1 is propelled by a battery operated traction motor drive system (not shown) mounted in an enclosure 8.

Figure 2:
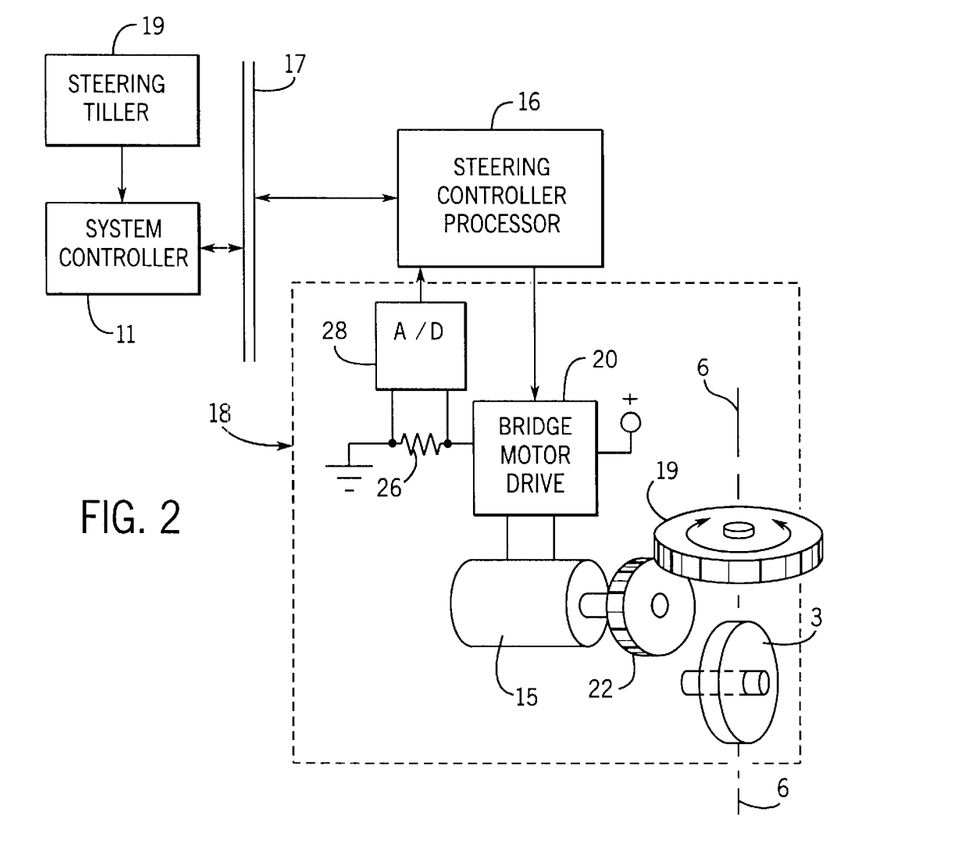
FIG. 2; is an electrical block diagram of the steer system in the industrial truck of FIG. 1.

The hydraulic system, traction drive system and steering motor are operated by a control system. Portions of this control system are shown in FIG. 2. The control system includes a system control 11 that is responsive to a steering direction signal provided by a steering tiller 19 to produce a steering command. These steering commands are conveyed through a bus structure 17 to a steering controller processor 16. As will be explained in more detail below, the steering controller processor 16 is programmed to operate a steering unit 18 in response to the steering tiller command signals.

The steering unit 18 includes a H-bridge motor drive 20 which receives left and right steering commands from the steering controller processor 16 and produces a corresponding current flow in a steer motor 15. The magnitude of this current is related to operator steer rate and its direction through the motor is determined by the operator steer direction. The motor 15 rotates gears 22 and 19 to steer the rear steerable drive wheel 3.

A steering motor current feedback signal is provided by a resistor 26 and applied to an analog-to-digital converter 28.

Figure 6:
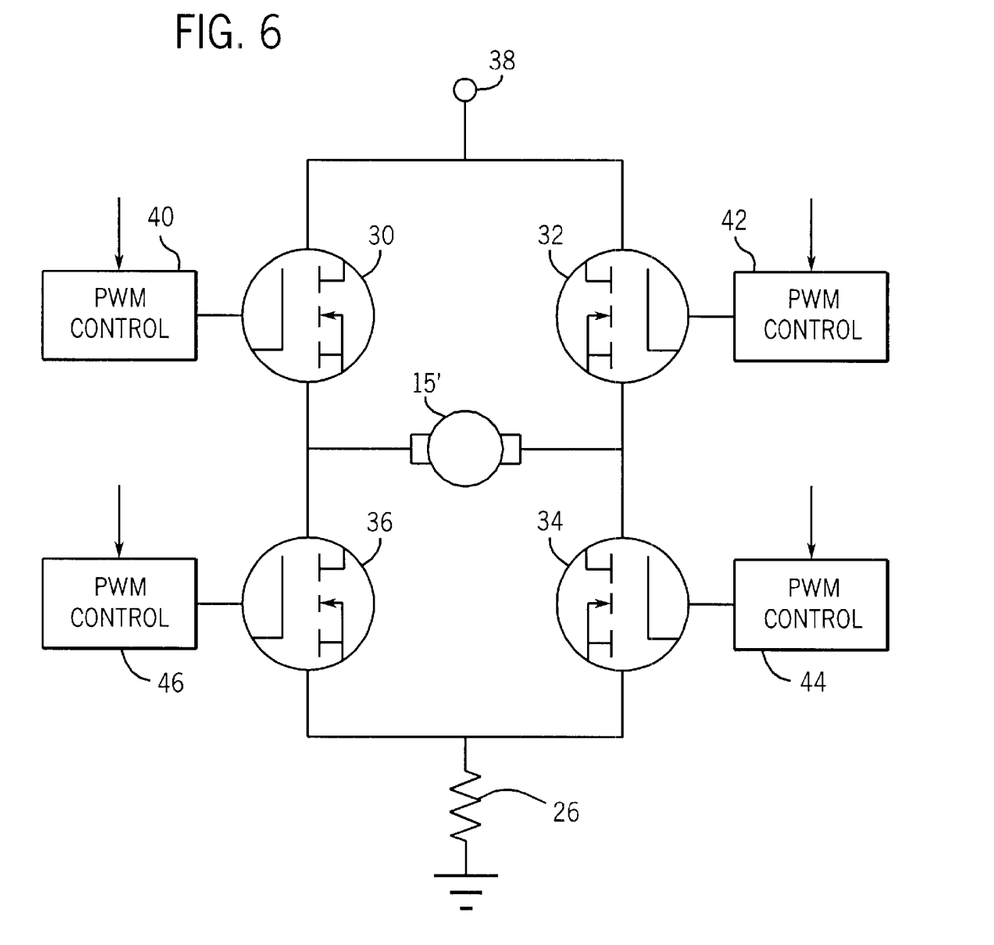
FIG. 6 is an electrical block diagram of the motor drive that forms part of the steer system of FIG. 2.

The A/D converter 28 provides a digitized sample of the steering motor current which is input periodically and used to perform the integrity check as will be described below. Referring particularly to FIG. 6, the motor drive 20 includes a set of four MOSFET switches 30, 32, 34 and 36 which connect with the steering motor armature 15' in an H bridge configuration. DC power is applied across this H bridge at terminal 38 and circuit ground, and the current feedback resistor 26 is connected in series therewith. PWM control circuits 40, 42, 44 and 46 drive the respective switches 30, 32, 34 and 36 in response to steer command signals received from the steering controller processor 16. When a steering command is produced to turn in one direction, the switch 30 is turned on and switch 34 is pulsed on to conduct current through the motor armature 15' in one direction. The duration of time that switch 34 is turned on determines the speed at which the steer motor 15 turns in that direction. When a steering command is produced to turn in the opposite direction, the switch 32 is turned on and switch 36 is pulsed to conduct current through the motor armature 15' in the opposite direction. The percentage of switch on time determines the voltage magnitude applied to the motor and thus the speed of steer rotation.

It should be apparent that the current feedback resistor 26 is located to check the proper current flow through the motor 15, the four switches 30, 32, 34 and 36 and the associated circuitry.

Figure 3A:
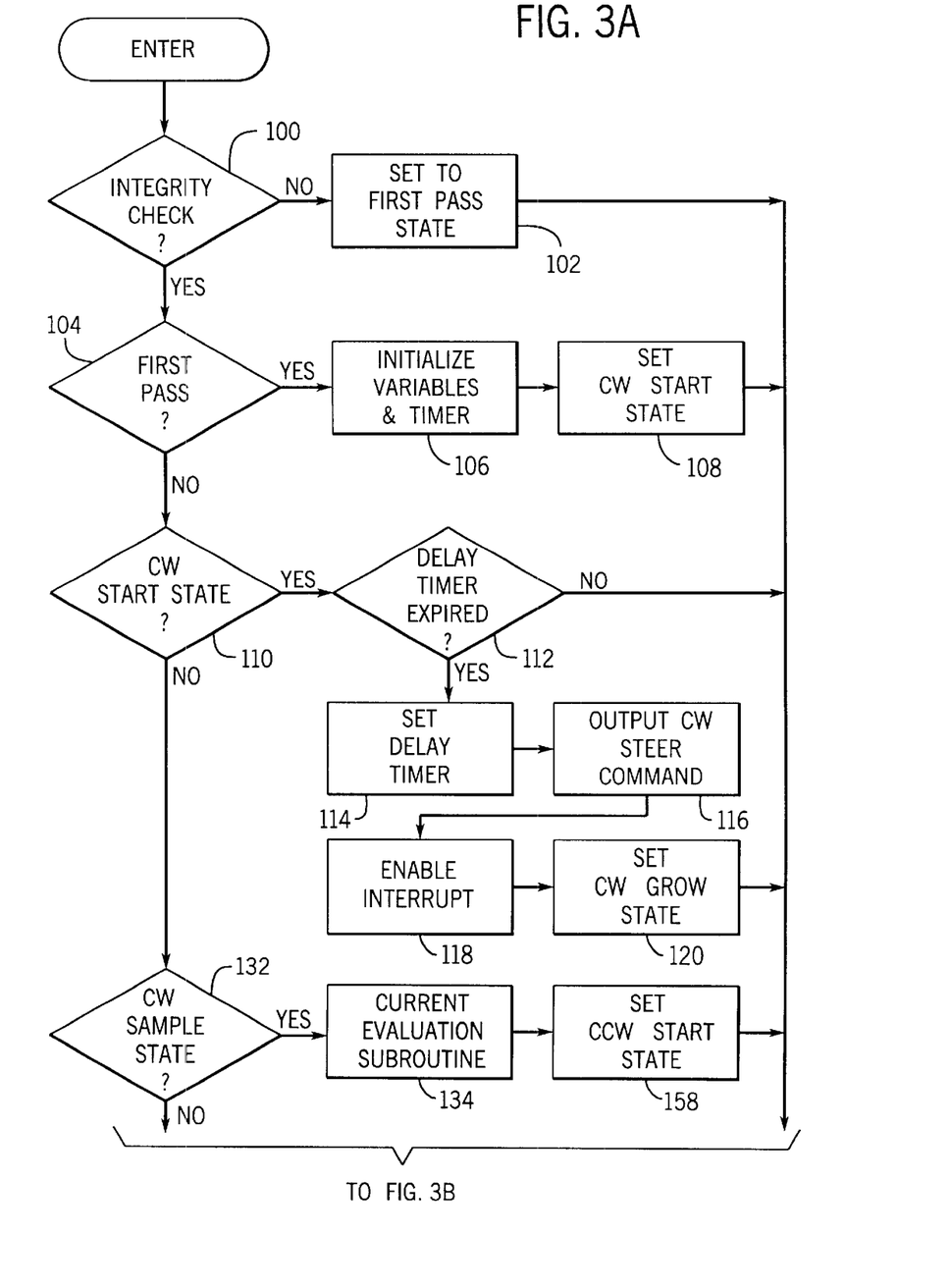
FIG. 3; is a flow chart of a program performed by a microprocessor in the steer system of FIG. 2 to practice the preferred embodiment of the invention.
Figure 3B:
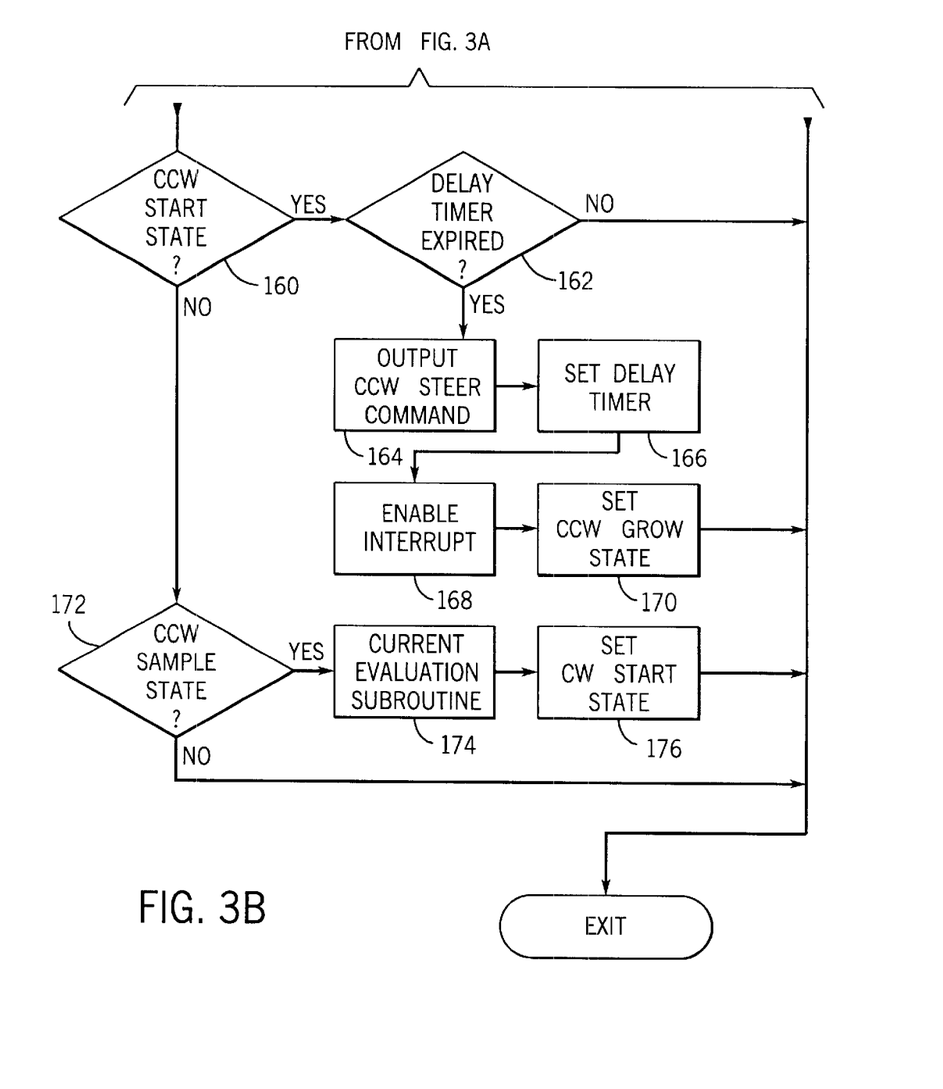

The present invention is implemented in programs performed by the steering control processor 16 at a rate of at least once every 50 milliseconds. Referring particularly to FIG. 3, the steer integrity check program is entered at decision block 100 which determines if the steering system is to be checked. In the preferred embodiment, the integrity check is performed if the truck is fully powered up, the main contactor is closed, the deadman pedal is depressed by the operator, and no manual steer or wire guidance command has been requested. If these conditions are not present, a number of timers, counters and variables are reset and an integrity check state flag is set to First Pass state as indicated at process block 102.

During the first pass through the steer integrity check program as determined at decision block 104, variables and timers used by the program are initialized as indicated at process block 106. A state flag is then set to CW START state as indicated by process block 108. During the subsequent pass through the program this state is detected at decision block 110 and a test is made at decision block 112 to determine if a 200 millisecond delay timer has expired. This timer insures that any residual currents still flowing in the steer motor circuit as a result of earlier steer commands have died out. If they have, the delay timer is reset to 50 milliseconds at process block 114 and a steer command is produced at process block 116. This steer command produces a very small clockwise (CW) current pulse that is output to the steer motor 15. This current pulse results in at most a barely detectable steer motor rotation, but it is high enough to provide a reliable current measurement. The integrity check current pulse should not be so large as to cause additional wear to the steer unit gear train. After this CW steer command is output, an interrupt is enabled at process block 118 and the state flag is set to the CW GROW state at process block 120.

Figure 4:
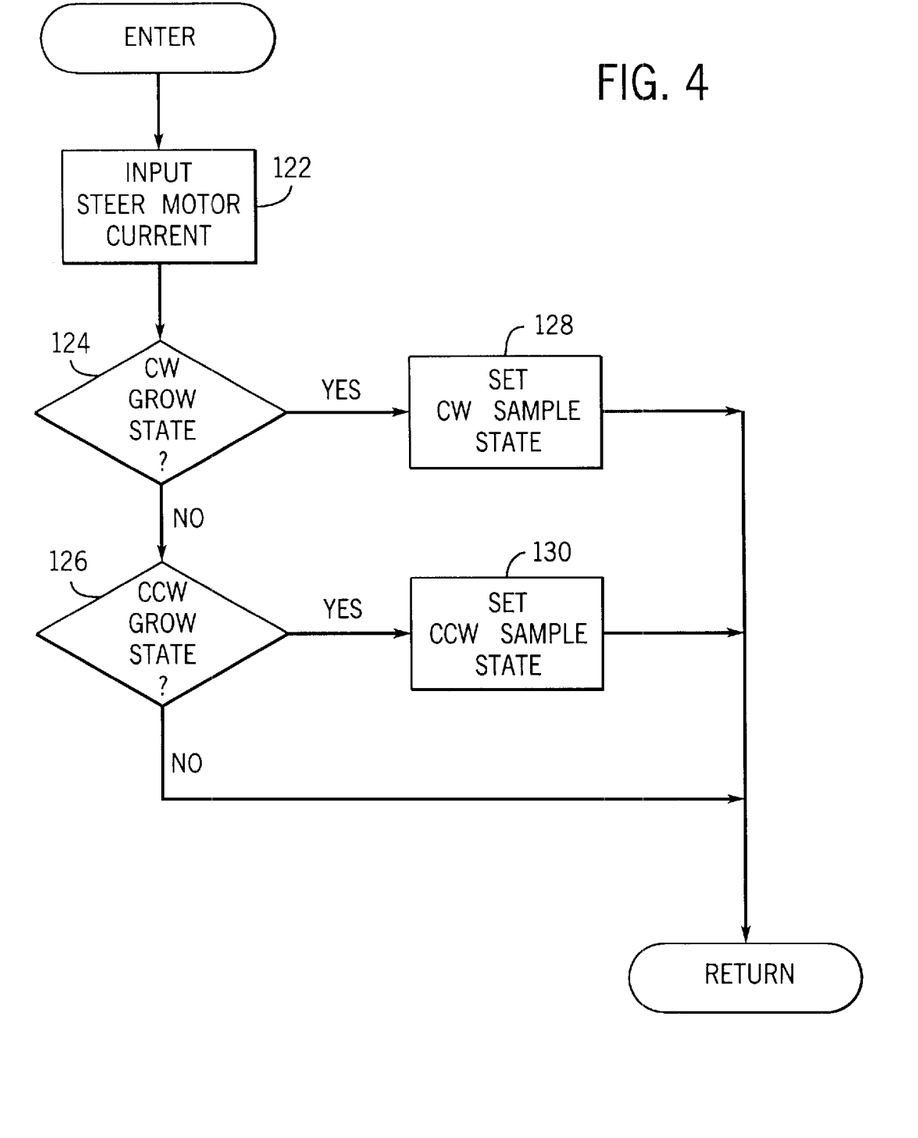
FIG. 4; is a flow chart of an interrupt service routine enabled by the program of FIG. 3.

The interrupt routine that is enabled at process block 118 is performed 4 milliseconds after a steer command is applied to the motor drive 20 as part of an interrupt service routine that inputs real-time information to the steering controller processor 16. One of these inputs is the steering motor current sampled by the analog-to-digital converter 28. Referring to FIG. 4, this steer motor current is input at process block 122 and the state flag is checked at decision blocks 124 and 126. If in the CW GROW state, the state flag is changed to the CW SAMPLE state as indicated at process block 128, and if it is in the CCW GROW state, the state flag is set to the CCW SAMPLE state at process block 130.

Referring again to FIG. 3, after the interrupt service routine inputs the steer motor current and sets the state flag to the CW SAMPLE state, this is detected at decision block 132. A current evaluation subroutine is then called at 134 to determine if a fault condition is present.

Figure 5:
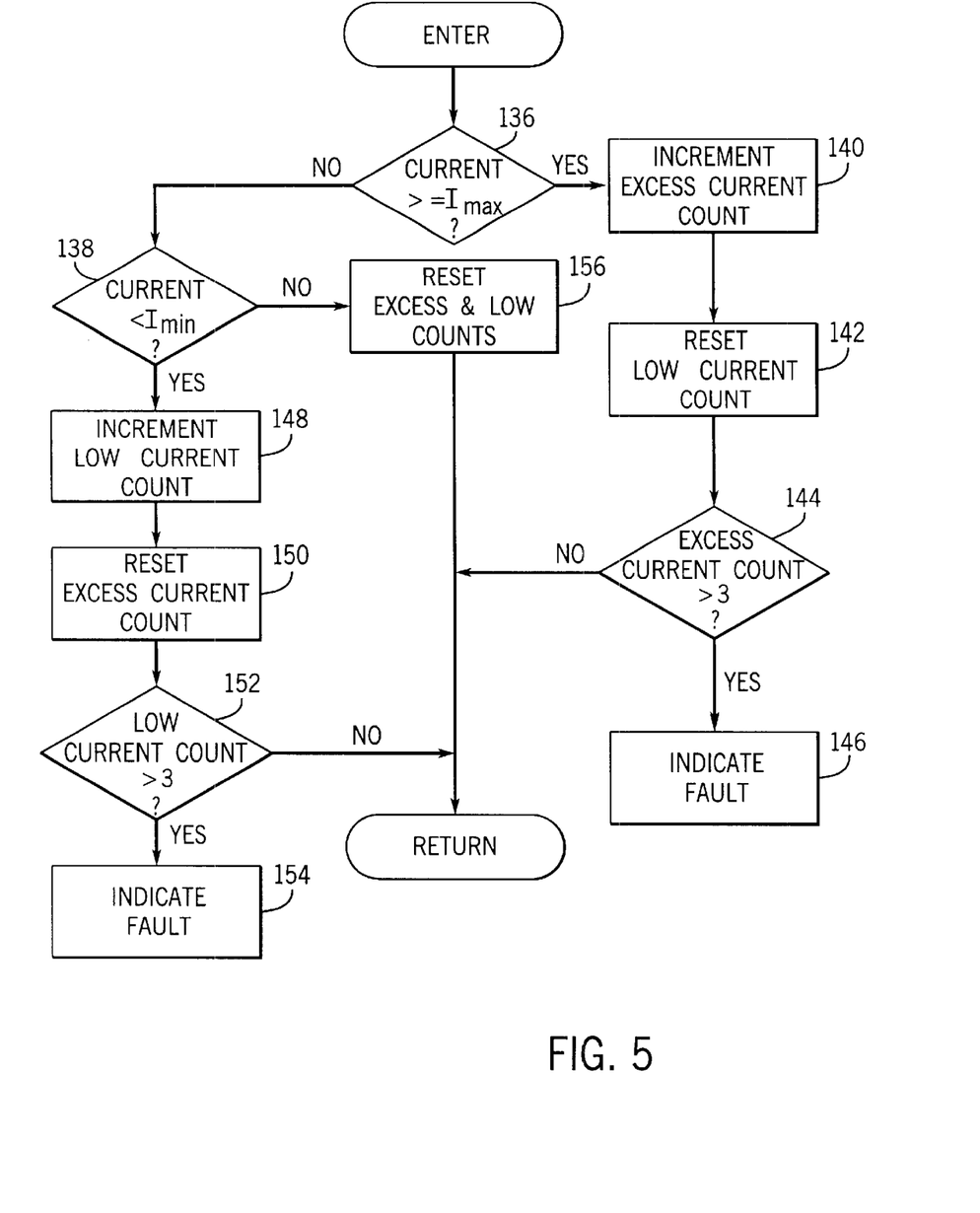
FIG. 5 is a flow chart showing a subroutine called by the program in FIG. 3.

The current evaluation subroutine is shown in FIG. 5 and includes instructions that determine at decision block 136 if the steer motor current is greater than or equal to a maximum value ($I_{max}$), and instructions that determine at decision block 138 if the steer motor current is below a minimum value ($I_{min}$). If the measured steer motor current is above the maximum, $I_{max}$ a short circuit condition may be present and an excess current counter is incremented at process block 140. In such case, a low current counter is reset at process block 142 and a test is made at decision block 144 to determine if the excess current counter has exceeded a count of three. If so, a short circuit fault is indicated at process block 146. The fault indication may be made in many ways, but in the preferred embodiment a visual indication is made to the operator and the main contactor is opened to disconnect the battery and shut down the truck.

A fault is also indicated if low steer motor current is detected over a period of time. Referring still to FIG. 5, if a low current condition is detected at decision block 138, a low current counter is incremented at process block 148 and the excess current counter is reset at process block 150. If the low current counter has a value greater than three as determined at decision block 152, an open circuit fault is indicated at process block 154. As indicated above, the operator is given a visual fault indication and the truck is shut down. If neither an under current or over current condition is detected, both the excess current counter and the low current counter are reset as indicated at process block 156. Thus, to produce a fault indication, four successive steer motor current samples must indicate a low current or excess current in order to trigger a fault indication.

Referring again to FIG. 3, if no fault is indicated while in the CW SAMPLE state, the state flag is set to the CCW START state as indicated at process block 158. During the next pass through the steer integrity check program, therefore, the system branches at decision block 160 which checks for the CCW START state. The delay timer is checked at decision block 162, and if 50 msecs. have transpired since it was set at process block 114, a counter clockwise (CCW) steer command is produced at process block 164. As with the CW steer command discussed above, the COW steer command is large enough to produce a reliably measured steer motor current without producing much movement. The delay timer is then reset to 50 msecs. as indicated at process block 166, and the interrupt is again enabled at process block 168. The state flag is then set to the CCW GROW state as indicated at process block 170.

Referring again to FIG. 4, when the interrupt service routine is subsequently performed, the steer motor current is input at process block 122 and the state flag is set to the CCW SAMPLE state as indicated at process block 130. As a result, when the steer integrity check program (FIG. 3) is subsequently performed, the system branches at decision block 172 and the current evaluation subroutine is again performed at process block 174. As described above, the steer motor current is evaluated to determine if a short circuit or open circuit fault condition should be indicated. If not, the state flag is set at process block 176 to the CW START state.

As long as the conditions are proper as determined at decision block 100 to perform the steer integrity check, the system continues to produce a steer command every 50 msecs. and evaluate the resulting steer motor current. The commands alternate in direction such that the net steering command is zero and current flow in both directions through the steer motor can be evaluated. To improve the reliability of the evaluation and to reduce the probability of spurious fault indications, out of range current flow through the steer motor must be detected over a succession of test current pulses before a fault is indicated.

What is claimed is:

1. A method for checking the integrity of a steering system on an industrial truck which employs an electric steer motor to change the direction of the truck, the steps comprising:
   a) producing a series of steering commands of alternating direction;
   b) measuring current flow in the steering system that results from the series of alternating steering commands; and
   c) indicating a fault condition if the measured current flow is outside a preset range.

2. The method as recited in claim 1 in which a fault condition is indicated after the measured current flow is outside the preset range for a preset number of successive steering commands.

3. The method as recited in claim 1 in which the current flow through the steer motor is measured in step b).

4. The method as recited in claim 1 in which a short circuit condition is indicated if the measured current flow exceeds a preset amount.

5. The method as recited in claim 4 in which an open circuit condition is indicated if the measured current flow is below a second preset amount.

6. The method as recited in claim 4 in which the short circuit condition is indicated if the measured current flow exceeds the preset amount for a plurality of successive steering commands in the series.

7. The method as recited in claim 5 in which the open circuit condition is indicated if the measured current flow is below the second preset amount for a plurality of successive steering commands in the series.

8. A system for checking the integrity of a steering unit in a truck that employs an electric steer motor to change the direction of travel of the truck, which comprises:
   a steering control processor which produces a series of steering commands for the steering unit which direct the steering unit to make small changes in truck direction in alternating directions;
   a current sensor for measuring the current flow in the steering unit in response to steering commands;
   means for comparing the measured current with a preset maximum amount;
   means for comparing the measured current with a preset minimum amount; and
   means for indicating a fault condition if the measured current flow is outside a range of currents between the preset maximum amount and the preset minimum amount.

9. The system as recited in claim 8 in which the means for indicating a fault includes:
   a counter for counting the number of successive out of range current measurements made during production of the series of steering commands; and
   fault indicating means for indicating a fault when said counter exceeds a preset number.

10. The system as recited in claim 8 in which the means for indicating a fault includes:
    an excess current counter for counting the number of successive over current measurements made during production of the series of steering commands;
    a low current counter for counting the number of successive under current measurements made during production of the series of steering commands.

11. The system as recited in claim 8 in which the current sensor includes a resistor connected to conduct current which flows through the steer motor.

* * * * *